US011947127B2

(12) United States Patent
Karner et al.

(10) Patent No.: US 11,947,127 B2
(45) Date of Patent: *Apr. 2, 2024

(54) HEAD-UP DISPLAY

(71) Applicant: ENVISICS LTD, Milton Keynes (GB)

(72) Inventors: Mate Karner, Milton Keynes (GB); Jamieson Christmas, Milton Keynes (GB)

(73) Assignee: Envisics Ltd, Milton Keynes (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/721,836

(22) Filed: Apr. 15, 2022

(65) Prior Publication Data
US 2022/0244550 A1 Aug. 4, 2022

Related U.S. Application Data

(63) Continuation of application No. 17/059,935, filed as application No. PCT/EP2019/072516 on Aug. 22, 2019, now Pat. No. 11,307,425.

(30) Foreign Application Priority Data

Aug. 29, 2018 (GB) ..................... 1814053

(51) Int. Cl.
G02B 27/01 (2006.01)
B60K 35/00 (2006.01)
B60K 35/23 (2024.01)

(52) U.S. Cl.
CPC .......... *G02B 27/0179* (2013.01); *B60K 35/00* (2013.01); *G02B 27/0101* (2013.01); (Continued)

(58) Field of Classification Search
CPC ................ G02B 27/01; G02B 27/0101; G02B 27/0179; G02B 2027/014; (Continued)

(56) References Cited

U.S. PATENT DOCUMENTS 3,808,422 A * 4/1974 Handtmann .......... F21S 41/135
362/19
6,714,327 B1 3/2004 Abersfelder et al.
(Continued)

FOREIGN PATENT DOCUMENTS

DE 11 2015 002 814 T5 3/2017
EP 1544659 A1 6/2005
(Continued)

OTHER PUBLICATIONS

Combined Search and Examination Report for GB Application No. 1814053.3, dated Feb. 26, 2019, 9 pages.

*Primary Examiner* — Amy Onyekaba
*Assistant Examiner* — Cory A Almeida
(74) *Attorney, Agent, or Firm* — McDonnell Boehnen Hulbert & Berghoff LLP

(57) ABSTRACT

A head-up display for a vehicle having a window. The head-up display comprises a picture generating unit and a projection engine. The picture generating unit is arranged to output pictures. Each picture comprises a first picture component and a second picture component. The projection engine is arranged to receive the pictures output by the picture generating unit and project the pictures onto the window of the vehicle in order to form a first virtual image of the first picture component at a first virtual image distance and a second virtual image of the second picture component at a second virtual image distance. Light of the first picture component is polarised in a first polarisation direction and light of the second picture component is polarised in a second polarisation direction perpendicular to the first polarisation direction. The projection engine comprises an optical element having first optical power in the first polarisation direction and second optical power in the second polarisation direction such that the first virtual image distance is not equal to the second virtual image distance. The (Continued)

projection engine is further arranged such that the first virtual image and second virtual image at least partially overlap.

18 Claims, 11 Drawing Sheets

(52) U.S. Cl.
CPC .......... *B60K 35/23* (2024.01); *G02B 27/0103* (2013.01); *G02B 2027/0105* (2013.01); *G02B 2027/0109* (2013.01); *G02B 2027/0127* (2013.01); *G02B 2027/014* (2013.01); *G02B 2027/0145* (2013.01); *G02B 2027/0185* (2013.01); *G02B 2027/0196* (2013.01)

(58) Field of Classification Search
CPC .... G02B 2027/0145; G02B 2027/0185; G02B 2027/0196; G02B 27/0103; G02B 27/017; G02B 2027/0105; G02B 2027/0109; G02B 2027/0127; B60K 35/00; B60K 2370/1529
See application file for complete search history.

(56) References Cited

U.S. PATENT DOCUMENTS

| 10,088,685 | B1* | 10/2018 | Aharoni | ............ | G02B 6/0076 |
| 10,254,551 | B2* | 4/2019 | Kishigami | ........... | H04N 9/3155 |
| 2015/0061976 | A1 | 3/2015 | Ferri | | |
| 2015/0069216 | A1 | 3/2015 | Hutchin | | |
| 2015/0205126 | A1 | 7/2015 | Schowengerdt | | |
| 2016/0202479 | A1 | 7/2016 | Okayama et al. | | |
| 2016/0202482 | A1 | 7/2016 | Kuzuhara et al. | | |
| 2017/0269428 | A1 | 9/2017 | Otani et al. | | |
| 2018/0124364 | A1 | 5/2018 | Yata et al. | | |

FOREIGN PATENT DOCUMENTS

| EP | 2030072 | A1 | 3/2009 |
| EP | 3312659 | A1 | 4/2018 |
| GB | 2448132 | A | 10/2008 |
| GB | 2461294 | A | 12/2009 |
| GB | 2498170 | A | 7/2013 |
| GB | 2501112 | A | 10/2013 |
| GB | 2552851 | A1 | 2/2018 |
| JP | 2009184406 | A | 8/2009 |
| JP | 2018-041046 | A | 3/2018 |
| KR | 20080007772 | A | 1/2008 |
| KR | 2018-0063688 | A | 6/2018 |
| WO | 2010/125367 | A1 | 11/2010 |
| WO | 2015/159521 | A1 | 10/2015 |
| WO | 2016/147570 | A1 | 9/2016 |
| WO | 2017/195026 | A2 | 11/2017 |
| WO | 2017/204494 | A1 | 11/2017 |
| WO | 2018/101552 | A2 | 6/2018 |

* cited by examiner

HEAD-UP DISPLAY

CROSS-REFERENCE TO RELATED APPLICATIONS

The present application is a continuation of U.S. patent application Ser. No. 17/059,935, filed Nov. 30, 2020, which is a U.S. National Stage application of International Patent Application no. PCT/EP2019/072516, filed Aug. 22, 2019, which claims the benefit of priority of United Kingdom Patent Application no. 1814053.3, filed Aug. 29, 2018. The entire disclosure contents of these applications are herewith incorporated by reference into the present application in their entirety.

FIELD

The present disclosure relates to a projector. More specifically, the present disclosure relates to a holographic projector and holographic projection system. Some embodiments relate to a head-up display and a head-mounted display. Some embodiments relate to a dual-plane head-up display and a method of projecting images to a first virtual image plane and second virtual image plane at least partially overlapping the first virtual image plane.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram, "CGH", may be calculated by a technique based on a mathematical transformation such as a Fresnel or Fourier transform. These types of holograms may be referred to as Fresnel or Fourier holograms. A Fourier hologram may be considered a Fourier domain representation of the object or a frequency domain representation of the object. A CGH may also be calculated by coherent ray tracing or a point cloud technique, for example.

A CGH may be encoded on a spatial light modulator, "SLM", arranged to modulate the amplitude and/or phase of incident light. Light modulation may be achieved using electrically-addressable liquid crystals, optically-addressable liquid crystals or micro-mirrors, for example.

The SLM may comprise a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The SLM may be reflective meaning that modulated light is output from the SLM in reflection. The SLM may equally be transmissive meaning that modulated light is output from the SLM is transmission.

A holographic projector for imaging may be provided using the described technology. Such projectors have found application in head-up displays, "HUD", and head-mounted displays, "HMD", including near-eye devices, for example.

There is disclosed herein an improved head-up display. Specifically, there is disclosed an improved head-up display arranged to display driver information at two different virtual planes. Yet more specifically, there is disclosed a head-up display arranged to display driver information at two different virtual planes which are at least partially overlapping.

SUMMARY

Aspects of the present disclosure are defined in the appended independent claims.

There is disclosed herein an improved HUD for an automotive vehicle. The HUD includes a picture generating unit arranged to generate a picture including information content, such as speed or navigation information, and an optical system (such as a projection system or projection engine) arranged to form a virtual image of the information content. The virtual image of the information content is formed at suitable viewing positions for the driver such as within the driver's normal field of view whilst operating the automotive vehicle. For example, the virtual image of the information content may appear at a first and/or second distance down the bonnet (or hood) of the vehicle from the driver. The virtual image of the information content is positioned so as not to adversely affect the driver's normal view of the scene. The virtual image of the information content may be overlaid on the driver's view of the real world. The information content is computer-generated and may be controlled or updated in real-time to provide real-time information to the driver.

In summary, the picture generating unit of some embodiments comprises a holographic projector in which the picture is a holographic reconstruction of a computer-generated hologram. The picture is formed on a light receiving surface which acts as a display. A HUD based on the holographic projector described in full below is able to deliver a much greater contrast ratio than currently available competing technologies because of the efficiency of the holographic process and its inherent suitability for use with a laser light source. However, in other examples, the picture generating unit is not a holographic projector.

The optical system includes at least one optical element such as a reflector. The optical system may include any number of reflectors such as one or two reflectors. The optical system is arranged to provide compactness (e.g. by folding the optical path) and impart the necessary optical power for magnification. The windscreen of the vehicle is used as an optical combiner for combining the driver's view of the real world with the computer-generated information content. Using the windscreen of the vehicle as the optical combiner presents numerous optical and holographic challenges. For example, the windscreen may have a spatially-varying complex curvature. Systems using the windscreen as the optical combiner are distinguished from systems which use an additional optical combiner (such as a flat glass plate) which, for example, pops-up from the dashboard of the vehicle. In some embodiments, the optical combiner is an additional optical component rather than the windscreen.

There is provided a head-up display for a vehicle having a window. The head-up display comprises a picture generating unit and a projection engine. The picture generating unit is arranged to output pictures. Each picture comprises a first picture component and a second picture component. The projection engine is arranged to receive the pictures output by the picture generating unit and project the pictures onto the window of the vehicle in order to form a first virtual image of the first picture component at a first virtual image distance from a viewing plane and a second virtual image of the second picture component at a second virtual image distance from the viewing plane. Light of the first picture component is polarised in a first polarisation direction and light of the second picture component is polarised in a second polarisation direction perpendicular to the first polarisation direction. The projection engine comprises an optical element arranged to receive light of the first picture component and light of the second picture component. The optical element has first optical power in the first polarisation direction and second optical power in the second polarisation direction such that the first virtual image distance is not equal to the second virtual image distance. The light of the first picture component forms a first light footprint on the optical element and light of the second picture component forms a second light footprint on the optical element. The first light footprint and second light footprint at least partially overlap. Accordingly, the first virtual image and second virtual image at least partially overlap. More specifically, the first virtual image and second virtual image at least partially overlap when viewed from a viewing plane inside the vehicle.

There is provided a head-up display for a vehicle having a window. The head-up display comprises a picture generating unit and a projection engine. The picture generating unit is arranged to output pictures. Each picture comprises a first picture component and a second picture component. The projection engine is arranged to receive the pictures output by the picture generating unit and project the pictures onto the window of the vehicle in order to form a first virtual image of the first picture component at a first virtual image distance and a second virtual image of the second picture component at a second virtual image distance. Light of the first picture component is polarised in a first polarisation direction and light of the second picture component is polarised in a second polarisation direction perpendicular to the first polarisation direction. The projection engine comprises an optical element having first optical power in the first polarisation direction and second optical power in the second polarisation direction such that the first virtual image distance is not equal to the second virtual image distance. The projection engine is further arranged such that the first virtual image and second virtual image at least partially overlap.

The head-up display in accordance with the present disclosure provides image content at a plurality of distances from the viewing plane. The focusing power of the optical system (i.e. the effective focal length of the optical system) and the position of the picture relative to the optical system (i.e. the "object" distance) determine the distance of the image content from the viewing plane (i.e. the "image" distance). A plurality of light channels is provided wherein each light channel provides one of the virtual images. A first light channel forms a first virtual image of the first picture component which may be far-field image content such as navigation information. The second light channel forms the second virtual image of a second picture component which may be near-field image content such as speed information. In order to form the first virtual image and second virtual image at different distances from the viewing plane, a different optical (or focusing) power is required for each light channel. Each light channel may comprise at least one optical element arranged to provide the required (e.g. unique) optical power for that light channel. However, such a configuration requires an increase in component count and requires spatial separation between the light channels. A consequence of the required spatial separation of the light channels is that the virtual images are also spatially separated. However, overlapping virtual images may be desired and the inventor has recognised that this may be provided by using a common optical element for both light channels to provide two different optical powers for two different virtual images by tuning the behaviour of the optical element based on a parameter of light. Optionally, this may be achieved by using the two different surfaces of a common optical element. Some embodiments use polarisation-selectivity but the same benefits can be achieved using colour-selectivity (i.e. wavelength or frequency). Accordingly, there is provided an improved dual-plane head-up display in which the first virtual image and second virtual image at least partially overlap.

The projection engine may be arranged such that the light ray bundle forming the second virtual image is at least partially contained within the light ray bundle forming the first virtual image. After the optical element, the light ray bundle forming the second virtual image is at least partially contained within the light ray bundle forming the first virtual image. The light ray bundle received by the optical element and forming the second virtual image is at least partially contained within the light ray bundle received by the optical element and forming the first virtual image. Accordingly, a compact dual-plane head-up display is provided.

The first picture component and second picture component may be coplanar. This is advantageous because it simplifies the design of the picture generating unit and minimises the volume of the head-up display. For example, the picture generating unit may comprise a light-receiving surface which moves, such as rotates, in order to increase the image quality by reducing the perception of laser speckle. If the first and second picture component are not coplanar, a plurality of moving light-receiving surfaces may be required which increases component count, increases volume and introduces complex alignment and synchronisation issues.

The optical element may be a polarisation-selective mirror having a first surface and second surface, wherein the first surface is reflective in the first polarisation direction and transmissive in the second polarisation direction, and the second surface is reflective in the second polarisation direction. A simple implementation of the inventive concept is therefore provided because polarisation is relatively easy to manipulate, using wave-plates for example, and polarisation-selective coatings and polarisation-selective filters are readily available. This implementation is further advantageous because it requires minimal modification to the picture generating unit. For example, a half-wave plate may be easily implemented to rotate the polarisation of one of the light channels by $\pi/2$ relative to the other light channel. A wave-plate is a thin component which may be readily inserted after the picture generating unit such as immediately after the light-receiving surface.

The first surface may have the first optical power and the second surface may have the second optical power. The first surface may be the front surface and the second surface may be the back surface, or vice versa. Each surface may therefore be individually tailored, such as shaped and/or coated, to the corresponding light channel without introducing further complexities.

The first surface may be a first freeform optical surface and the second surface may be a second freeform optical surface having a different surface profile to the first freeform optical surface. This feature allows each light channel to be individually tuned to reduce aberrations and correct for distortions caused by the complex curvature of the window, for example.

The first surface may be reflective to at least one wavelength of the light of the first picture component and transmissive to other wavelength/s, and the second surface may be reflective to at least one wavelength of the light of the second picture component. The light of each picture may be laser light and the phenomenon of solar glare may be reduced by providing first and second surfaces which have a wavelength-selective reflectivity.

The first picture component may be a far-field image and the second picture component may be a near-field image.

The window of the vehicle will reflect a portion of the incident light. It will be well-understood that the window will have an at least partial polarising effect owing to the change in refractive index. In some embodiment, light is incident on the window at Brewster's angle in which case the light is fully polarised by the optical interface. It is known that the so-called plane of incidence of light at the optical interface formed by the window defines an s-direction and a p-direction. Reference is made in this disclosure to the s-polarisation direction and p-polarisation direction of the window as shorthand for the s-direction and p-direction defined by the plane of incidence of light on the window and the normal to the window.

The first polarisation direction may be at an angle of $\pi/4$ to the s-polarisation direction of the window. This feature is advantageous because the proportion of light of the first picture component reflected by the window will be the same as the proportion of light of the second picture component reflected by the window. This provides a balanced system. For example, an additional brightness attenuating element, which is wasteful of optical energy, is not required to ensure one virtual image does not visually swamp the other virtual image.

The first polarisation direction may be the s-polarisation direction of the window and the second polarisation direction may be the p-polarisation direction of the window, and the projection engine may further comprise a quarter-wave plate arranged to receive the light of the first picture component and the light of the second polarisation component such that light of the pictures projected onto the window of the vehicle is circularly polarised. This feature is advantageous because it provides a simple alternative to ensuring that the same proportion of light of each light channel is reflected by the window.

The head-up display may comprise a glare trap window and the quarter-wave plate is a coating on the glare trap window. Alternatively, the quarter-wave plate may be a coating on the window. Accordingly, no additional optical components are required.

The picture generating unit may comprise a light source and a spatial light modulator. The light source may be arranged to emit light. The spatial light modulator may be arranged to receive the light from the light source and spatially-modulated the light in accordance with computer-generated holograms displayed on the spatial light modulator to form a holographic reconstruction corresponding to each picture.

The picture generating unit may further comprise a light-receiving surface arranged to receive the spatially-modulated light such that each picture is formed thereon.

The window may be a windscreen.

Reference is made throughout to a dual-plane head-up display arranged to display image content at two virtual planes but the present disclosure extends to a head-up display arranged to display image content at any plurality of virtual image planes. That is, embodiments described may equally be plural-plane head-up displays or head-up displays arranged to display image content at a plurality of planes.

There is also provided a head-up display for a vehicle having a window. The head-up display comprises a picture generating unit and a projection engine. The picture generating unit is arranged to output pictures. Each picture comprises a first picture component and a second picture component. The projection engine is arranged to receive the pictures output by the picture generating unit and project the pictures onto the window of the vehicle in order to form a first virtual image of the first picture component at a first virtual image distance and a second virtual image of the second picture component at a second virtual image distance. Light of the first picture component is polarised in a first polarisation direction and light of the second picture component is polarised in a second polarisation direction perpendicular to the first polarisation direction. The projection engine comprises at least one polarisation-selective optical component arranged such that the first virtual image distance is different to the second virtual image distance.

There is further provided a head-up display for a vehicle having a window. The head-up display comprises a picture generating unit and a projection engine. The picture generating unit is arranged to output pictures. Each picture comprises a first picture component and a second picture component. The projection engine is arranged to receive the pictures output by the picture generating unit and project the pictures onto the window of the vehicle in order to form a first virtual image of the first picture component at a first virtual image distance and a second virtual image of the second picture component at a second virtual image distance. A property state of the light of the first picture component is different to the property state of the light of the second picture component. The projection engine comprises an optical element arranged to receive pictures from the picture generating unit, wherein the optical element has an optical power dependent on the property state such that the first virtual image distance is not equal to the second virtual image distance. The projection engine is further arranged such that the first virtual image and second virtual image at least partially overlap. The property state may be the angle of linear polarisation and the property state of the light of the first picture component may be perpendicular to the property state of the light of the second picture component. That is, the difference between the property state of the light of the first picture component and the property state of the light of the second picture component may be $\pi/2$. The property state of the light of the first picture may be $\pi/4$ to the s-polarisation direction for the windscreen (defined by the direction of the light and the normal to the window). That is, the difference between the property state of the light of the first picture component (or the property state of the light of the second picture component) and the s-polarisation direction for the windscreen may be $\pi/4$. Alternatively, the property state may be wavelength and the optical element may have a first optical power at a first wavelength (or first plurality of wavelengths) and a second optical power at a second wavelength (or second plurality of wavelengths). The first wavelength (or first plurality of wavelengths) may be different to—i.e. substantially non-overlapping with—the second wavelength (or second plurality of wavelengths).

The term "light of the picture" is used herein to refer to the light which forms the picture and emanates (for example, scattered) from the light receiving surface. In other words, the "light of the picture" is the light forming the picture. The "light of the picture" is imaged by the optical system and windscreen. The "light of the picture" may be monochromatic or polychromatic. The "light of the picture" may be composite colour. For example, the "light of the picture" may comprise red, green and blue light. The "light of the picture" may be polarised such as linearly polarised.

The term "property state" is used herein to refer to the state (or condition) of a property (or parameter or characteristic) of light. For example, the property may be polarisation or wavelength but the term "property state" encompasses other defining properties of light. The "state" is the value or condition of that the property. For example, if the property is polarisation, the state of the property may be an angle of linear polarisation such as s-polarised and, if the property is wavelength, the state may be a length in nanometres such as 650.

Although reference is made throughout to "mirrors", it may be understood that these elements are not necessarily reflective to all colours and all polarisation states. That is, although an element may be labelled herein a "mirror", that element may be selectively reflective and may exhibit non-reflectivity to light having certain characteristics. For example, an element may still be referred to herein as a "mirror" even if that element is only reflective to one colour or polarisation state, for example.

Reference is made to "coatings" on mirrors but it is well-known in the art that each coating—e.g. a wavelength-selective filter—may comprises a plurality of dielectric layers or individual dielectric coatings. It will be understood that a mirror may comprise multiple components such as coatings or filters. The mirror will have a reflective component. In embodiments, the filters disclosed herein are the reflective component. In other embodiments, the filters are not the reflective component and cooperate with the reflective component to provide the functionality described.

The term "hologram" is used to refer to the recording which contains amplitude information or phase information, or some combination thereof, about the object. The term "holographic reconstruction" is used to refer to the optical reconstruction of the object which is formed by illuminating the hologram. The term "replay plane" is used herein to refer to the plane in space where the holographic reconstruction is fully formed. The term "replay field" is used herein to refer to the sub-area of the replay plane which can receive spatially-modulated light from the spatial light modulator. The terms "image", "replay image" and "image region" refer to areas of the replay field illuminated by light forming the holographic reconstruction. In embodiments, the "image" may comprise discrete spots which may be referred to as "image pixels".

The terms "encoding", "writing" or "addressing" are used to describe the process of providing the plurality of pixels of the SLM with a respect plurality of control values which respectively determine the modulation level of each pixel. It may be said that the pixels of the SLM are configured to "display" a light modulation distribution in response to receiving the plurality of control values. Thus, the SLM may be said to "display" a hologram.

It has been found that a holographic reconstruction of acceptable quality can be formed from a "hologram" containing only phase information related to the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will change the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
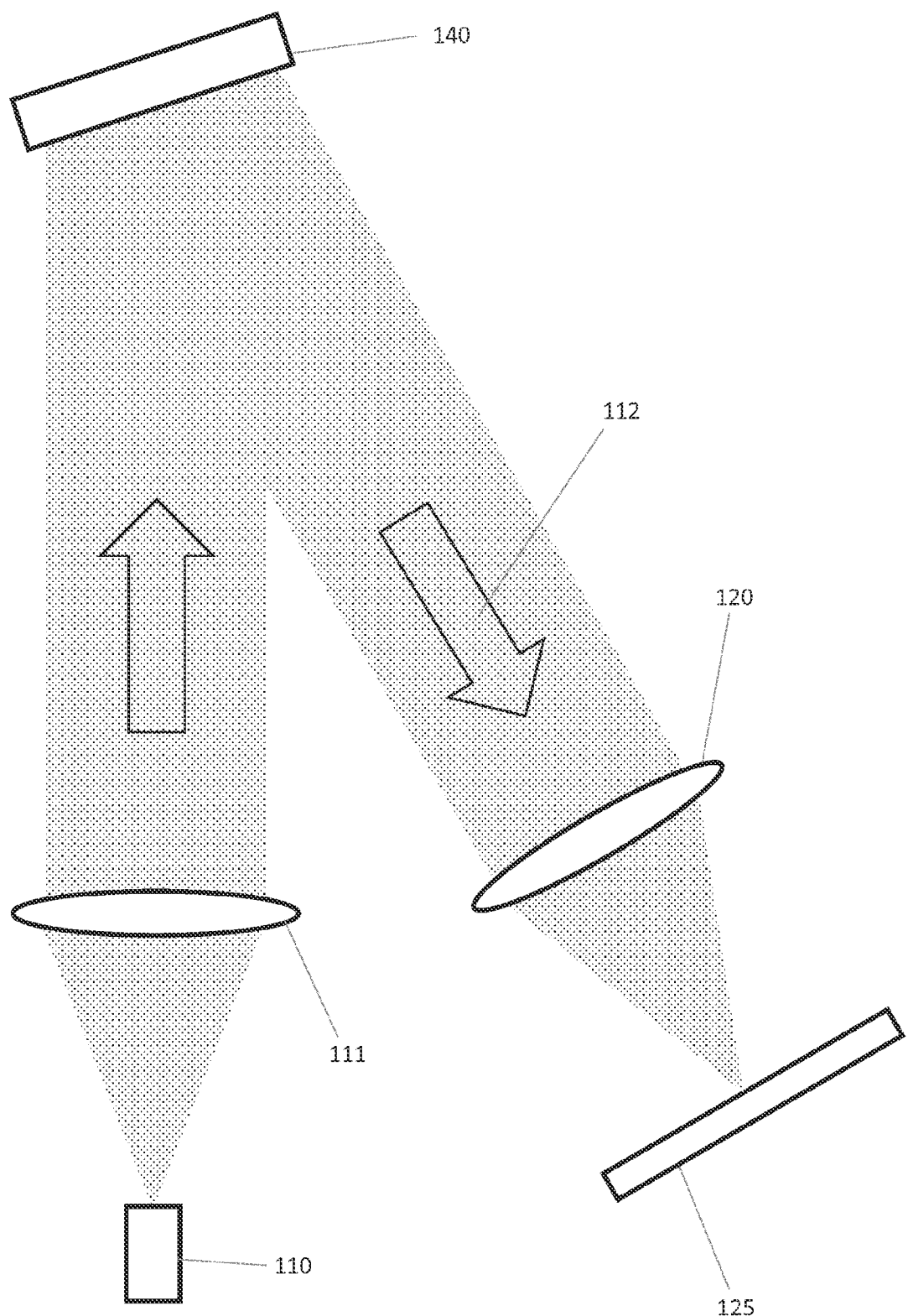
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $l_A(x, y)$ and $l_B(x, y)$, in the planes A and B respectively, are known and $l_A(x, y)$ and $l_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $l_A(x, y)$ and $l_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi[u, v]$ of the Fourier transform of the data set which gives rise to a known amplitude information T[x, y], wherein the amplitude information T[x, y] is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information ψP[u, v] is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
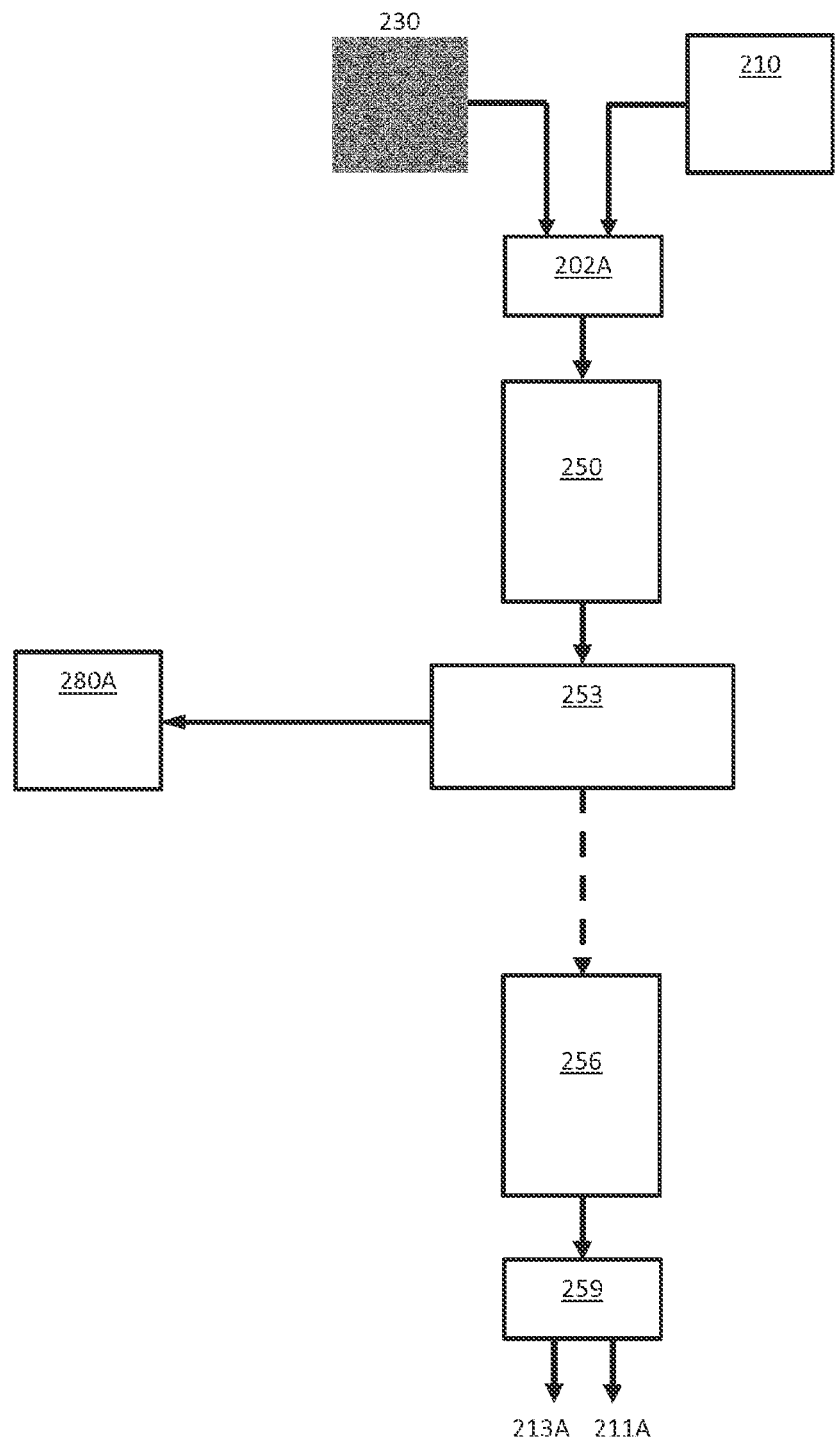
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
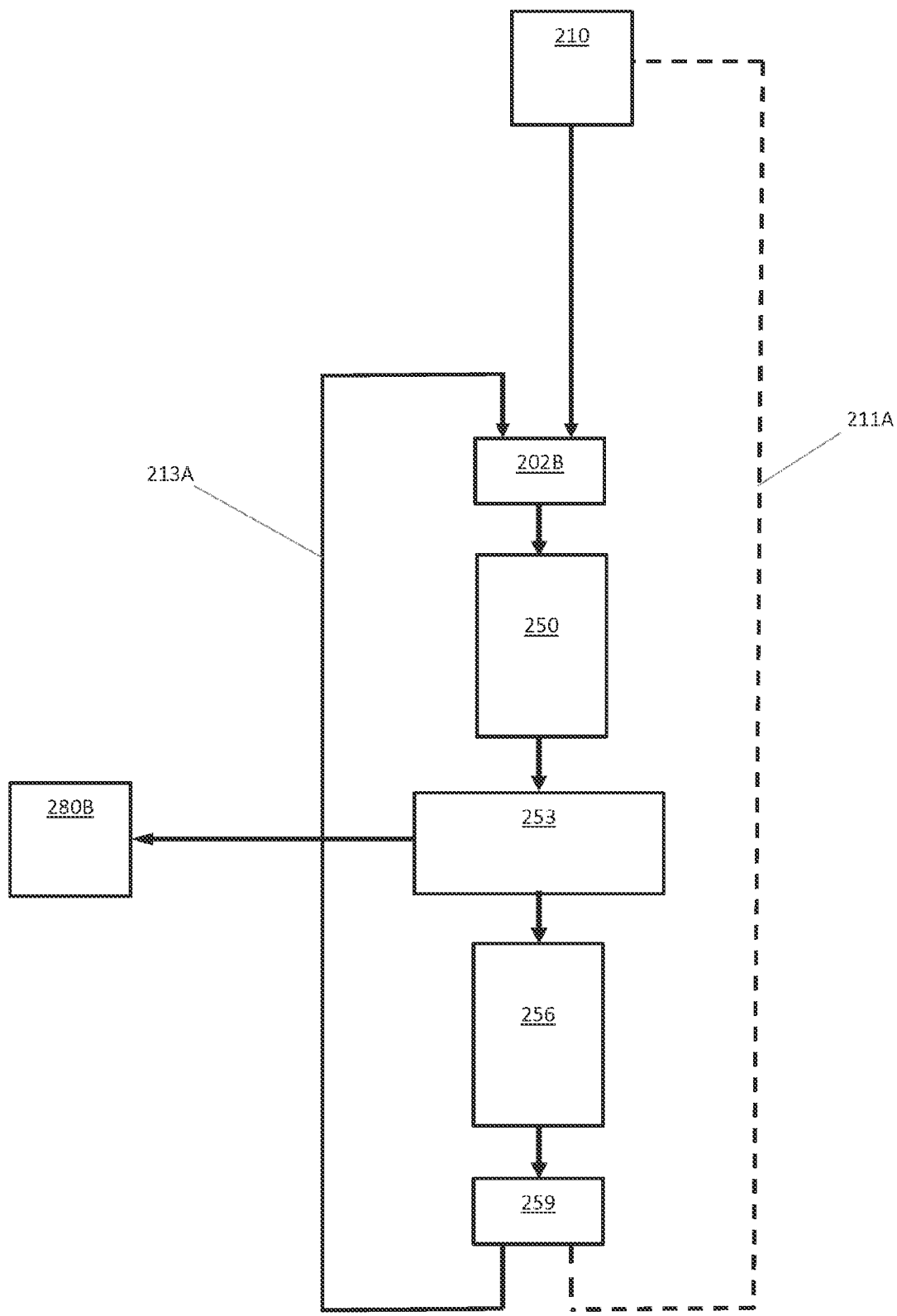
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
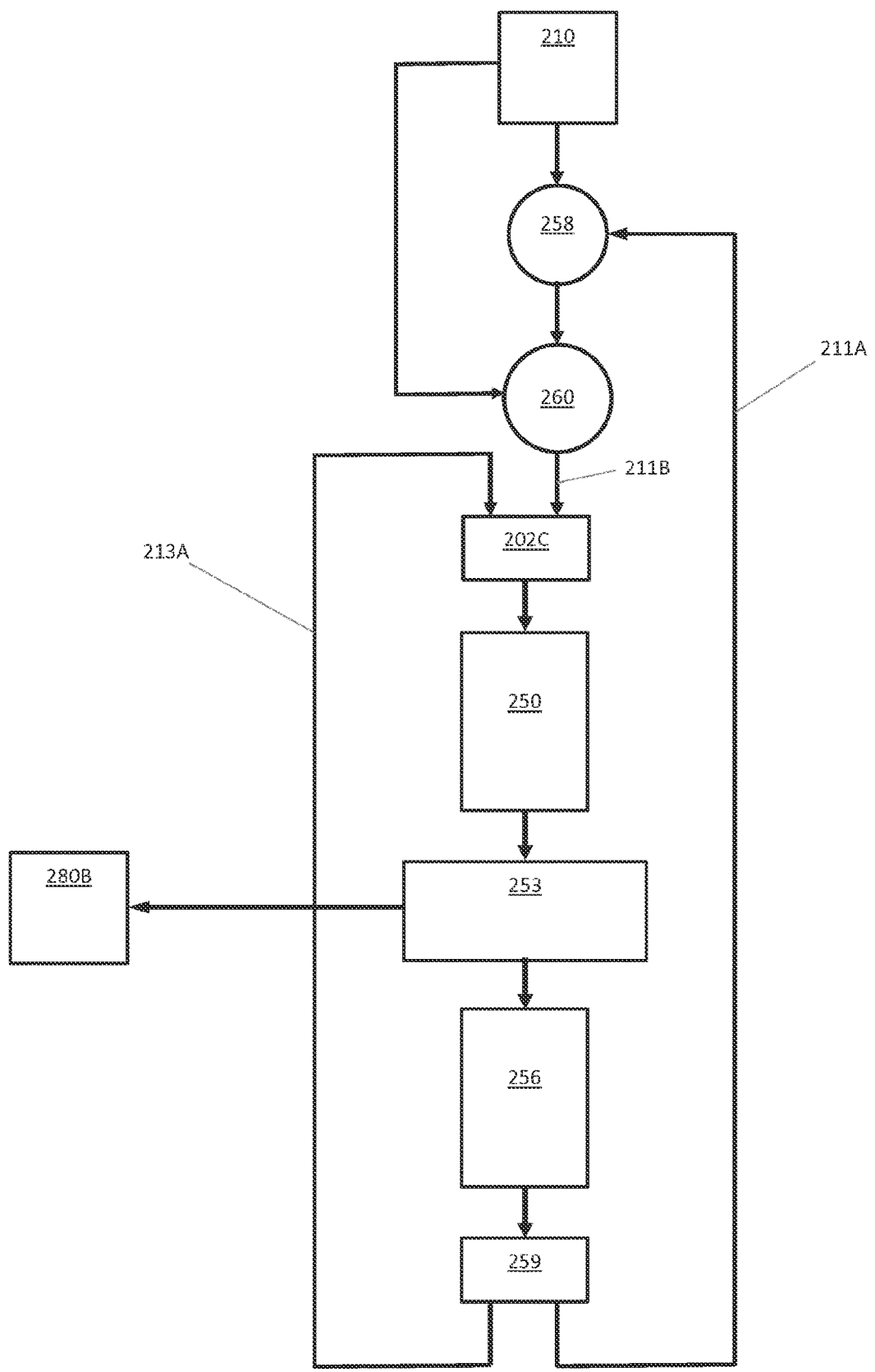
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor $\alpha$ and subtracts the scaled difference from the input image 210. This is expressed mathematically by the following equations, wherein the subscript text and numbers indicate the iteration number:

$$R_{n+1}[x,y] = F'\{\exp(i\psi_n[u,v])\}$$

$$\psi_n[u,v] = \angle F\{\eta \cdot \exp(i\angle R_n[x,y])\}$$

$$\eta = T[x,y] - \alpha(|R_n[x,y]| - T[x,y])$$

where:
F' is the inverse Fourier transform;
F is the forward Fourier transform;
R[x, y] is the complex data set output by the third processing block 256;
T[x, y] is the input or target image;
$\angle$ is the phase component;
$\psi$ is the phase-only hologram 280B;
$\eta$ is the new distribution of magnitude values 211B; and
$\alpha$ is the gain factor.

The gain factor $\alpha$ may be fixed or variable. In some embodiments, the gain factor $\alpha$ is determined based on the size and rate of the incoming target image data. In some embodiments, the gain factor $\alpha$ is dependent on the iteration number. In some embodiments, the gain factor $\alpha$ is solely function of the iteration number.

The embodiment of FIG. 2C is the same as that of FIG. 2A and FIG. 2B in all other respects. It may be said that the phase-only hologram $\psi(u, v)$ comprises a phase distribution in the frequency or Fourier domain.

In some embodiments, the Fourier transform is performed computationally by including lensing data in the holographic data. That is, the hologram includes data representative of a lens as well as data representing the object. In these embodiments, the physical Fourier transform lens 120 of FIG. 1 is omitted. It is known in the field of computer-generated hologram how to calculate holographic data representative of a lens. The holographic data representative of a lens may be referred to as a software lens. For example, a phase-only holographic lens may be formed by calculating the phase delay caused by each point of the lens owing to its refractive index and spatially-variant optical path length. For example, the optical path length at the centre of a convex lens is greater than the optical path length at the edges of the lens. An amplitude-only holographic lens may be formed by a Fresnel zone plate. It is also known in the art of computer-generated hologram how to combine holographic data representative of a lens with holographic data representative of the object so that a Fourier transform can be performed without the need for a physical Fourier lens. In some embodiments, lensing data is combined with the holographic data by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may include grating data—that is, data arranged to perform the function of a grating such as beam steering. Again, it is known in the field of computer-generated holography how to calculate such holographic data and combine it with holographic data representative of the object. For example, a phase-only holographic grating may be formed by modelling the phase delay caused by each point on the surface of a blazed grating. An amplitude-only holographic grating may be simply superimposed on an amplitude-only hologram representative of an object to provide angular steering of an amplitude-only hologram.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and holograms calculated by other techniques such as those based on point cloud methods.

Light Modulation

A spatial light modulator may be used to display the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimeters in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
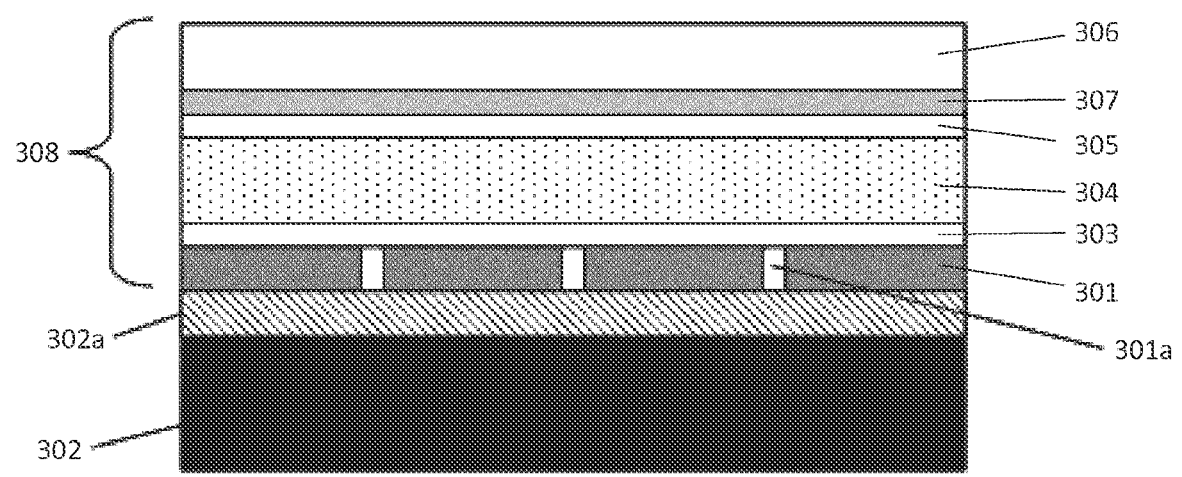
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Head-Up Display—Single Plane

Figure 4:
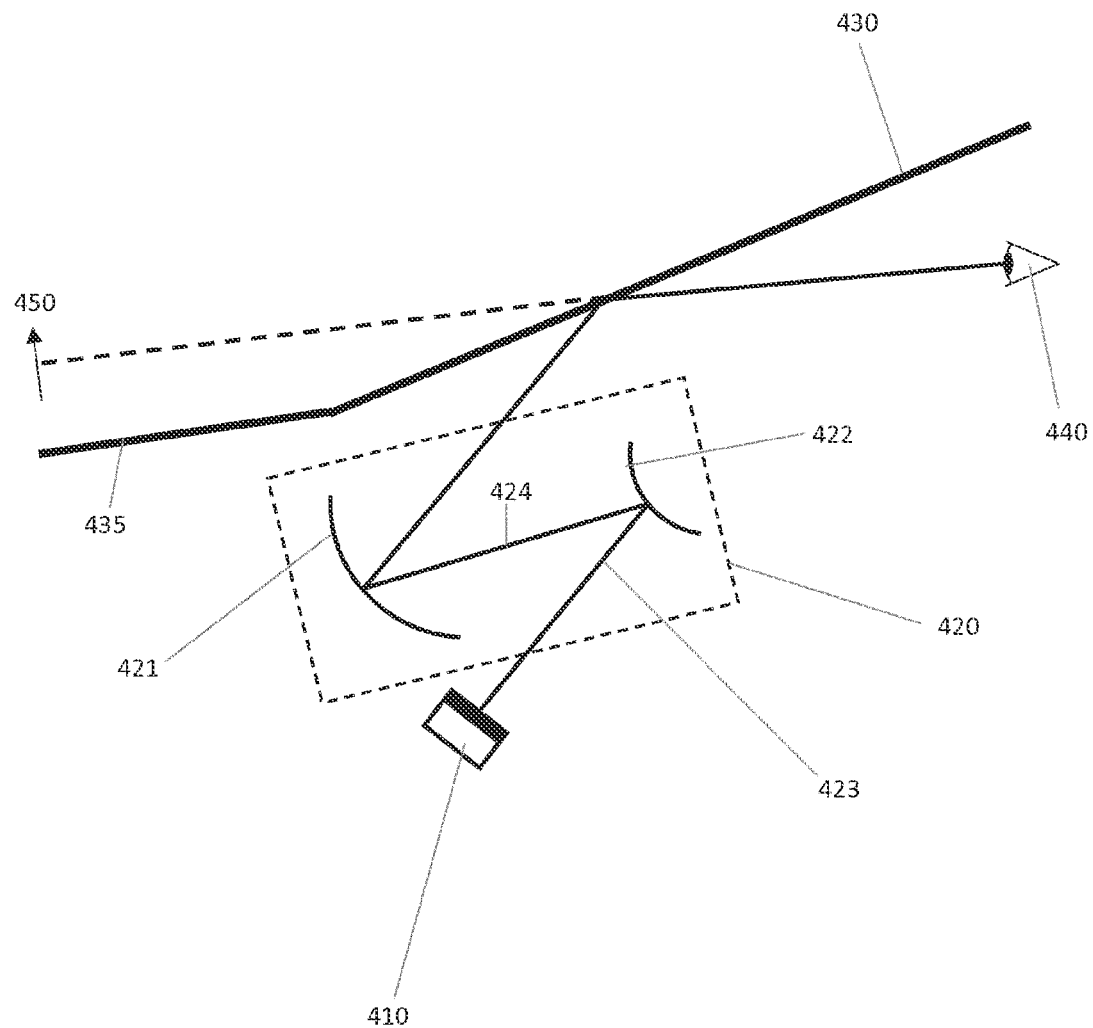
FIG. 4 shows a prior art head-up display comprising a z-fold optical configuration.

FIG. 4 shows a HUD in a vehicle such as a car. The windscreen 430 and bonnet (or hood) 435 of the vehicle are shown in FIG. 4. The HUD comprises a picture generating unit, "PGU", 410 and an optical system 420.

The PGU 410 comprises a light source, a light receiving surface and a processor (or computer) arranged to computer-control the image content of the picture. The PGU 410 is arranged to generate a picture, or sequence of pictures, on the light receiving surface. The light receiving surface may be a screen or diffuser. In some embodiments, the light receiving surface is plastic (that is, made of plastic).

The optical system 420 comprises an input port, an output port, a first mirror 421 and a second mirror 422. The first mirror 421 and second mirror 422 are arranged to guide light from the input port of the optical system to the output port of the optical system. More specifically, the second mirror 422 is arranged to receive light of the picture from the PGU 410 and the first mirror 421 is arranged to receive light of the picture from the second mirror 422. The first mirror 421 is further arranged to reflect the received light of the picture to the output port. The optical path from the input port to the output port therefore comprises a first optical path 423 (or first optical path component) from the input to the second mirror 422 and a second optical path 424 (or second optical path component) from the second mirror 422 to the first mirror 421. There is, of course, a third optical path (or optical path component) from the first mirror to the output port but that is not assigned a reference numeral in FIG. 4. The optical configuration shown in FIG. 4 may be referred to as a "z-fold" configuration owing to the shape of the optical path.

The HUD is configured and positioned within the vehicle such that light of the picture from the output port of the optical system 420 is incident upon the windscreen 430 and at least partially reflected by the windscreen 430 to the user 440 of the HUD. Accordingly, in some embodiments, the optical system is arranged to form the virtual image of each picture in the windscreen by reflecting spatially-modulated light off the windscreen. The user 440 of the HUD (for example, the driver of the car) sees a virtual image 450 of the picture in, or through, the windscreen 430. Accordingly, in embodiments, the optical system is arranged to form a virtual image of each picture on a windscreen of the vehicle. The virtual image 450 is formed a distance down the bonnet 435 of the car. For example, the virtual image may be more than 1 metre from the user 440 such as more than 1.5 metres or 1.5 to 50 metres such as 1.5 to 20 metres from the user 440. The output port of the optical system 420 is aligned with an aperture in the dashboard of the car such that light of the picture is directed by the optical system 420 and windscreen 430 to the user 440. In this configuration, the windscreen 430 functions as an optical combiner. In some embodiments, the optical system is arranged to form a virtual image of each picture on an additional optical combiner which is included in the system. The windscreen 430, or additional optical combiner if included, combines light from the real-world scene with light of the picture. It may therefore be understood that the HUD may provide augmented reality including a virtual image of the picture. For example, the augmented reality information may include navigation information or information related to the speed of the automotive vehicle.

In some embodiments, the first mirror and second mirror are arranged to fold the optical path from the input to the output in order to increase the optical path length without overly increasing the physical size of the HUD. In some other embodiments, the second mirror is omitted.

The picture formed on the light receiving surface of the PGU 410 may only be a few centimetres in width and height. The first mirror 421 and second mirror 422 therefore, collectively or individually, provide magnification. That is, the first mirror and/or second mirror may have optical power (that is, dioptric or focusing power). The user 440 therefore sees a magnified virtual image 450 of the picture formed by the PGU. The first mirror 421 and second mirror 422 may also correct for optical distortions such as those caused by the windscreen 430 which typically has a complex curved shape. The folded optical path and optical power in the mirrors (and, optionally, the windscreen) together allow for suitable magnification of the virtual image of the picture.

The PGU 410 comprises a holographic projector and a light receiving surface such as a screen or diffuser. In accordance with the disclosure above, the holographic projector comprises a light source, a spatial light modulator and a hologram processor. The spatial light modulator is arranged to spatially-modulate light in accordance with holograms represented on the spatial light modulator. The hologram processor is arranged to provide the computer-generated holograms. In some embodiments, the hologram processor selects a computer-generated hologram for output from a repository (e.g. memory) comprising a plurality of computer-generated holograms. In other embodiments, the hologram processor calculates and outputs the computer-generated holograms in real-time. In some embodiments, each picture formed by the PGU 410 is a holographic reconstruction on the light receiving surface. That is, in some embodiments, each picture is formed by interference of the spatially-modulated light at the light receiving surface.

The dashboard of the vehicle comprises an aperture because the HUD requires an optical path (preferably, an unobstructed optical path) to the windscreen. However, this optical path between the windscreen and HUD equally allows ambient light, such as sunlight, to get into the HUD. This causes various problems. In examples, the first mirror is therefore a cold mirror arranged to filter out infrared radiation. The cold mirror may reflect visible light but transmit infrared, "IR", light. In other examples, the first mirror 421 is a so-called hot/cold mirror which at least partially filters out IR and ultraviolet, "UV", light.

Head-Up Display—Dual-Plane

Figure 5:
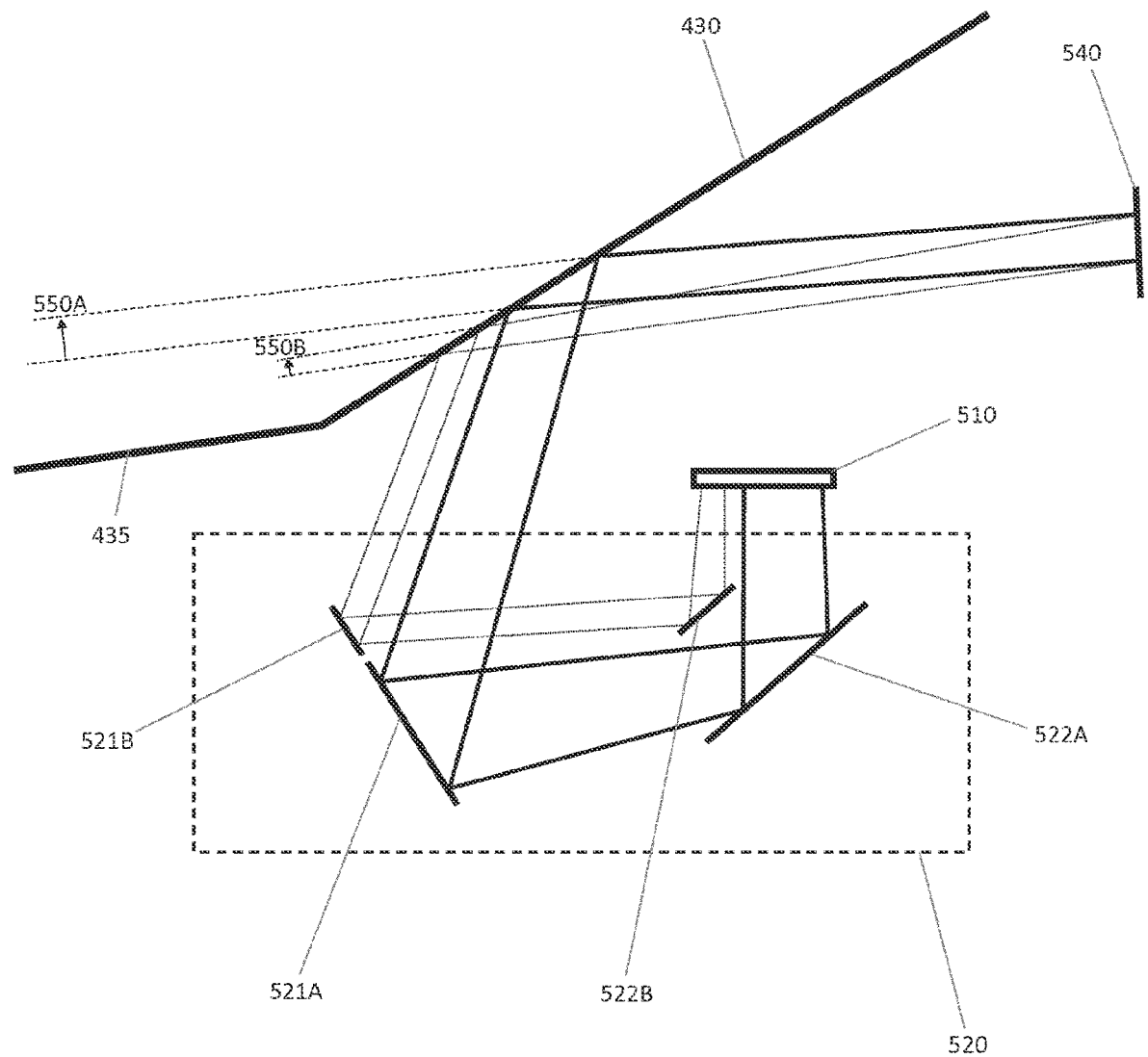
FIG. 5 shows a dual-plane head-up display.

FIG. 5 shows a first dual-plane HUD arranged to present information to the driver at two different planes: a far-field plane for a first virtual image 550A and a near-field plane for a second virtual image 550B. The terms "far-field" and "near-field" are merely used to reflect that one plane is closer to the viewing plane 540 of the driver than the other and no analogy with near-field and far-field diffraction patterns should be made. The terms "far plane" and "near plane" may equally be used. By way of example only, the first virtual image 550A at the far-field plane may be navigation information which appears to overlay the road—e.g. lane highlighting—and the second virtual image 550B at the near-field plane may be speed and gear information. Such image content is formed at two different planes by using two different optical paths to form two different virtual images, as explained in the following.

In more detail, FIG. 5 shows a picture generating unit 510 arranged to display a first picture component and second picture component. Light of the first picture component follows a first optical path from the picture generating unit 510 to the viewing plane 540 and light of the second picture component follows a second optical path from the picture generating unit 510 to the viewing plane 540. The first optical path is substantially parallel with the second optical path over its entire length.

The first mirror 421 of FIG. 4 is replaced by a first far-field mirror 521A for the first optical path and a first near-field mirror 521B for the second optical path. The first far-field mirror 521A and first near-field mirror 521B are shown in FIG. 5 as separate optical components but they may equally be different reflective surfaces of a common component. The first far-field mirror 521A has a first optical power—e.g. first curvature—arranged to form a first virtual image 550A of the first picture component at a first virtual image distance from the viewing plane 540. The first near-field mirror 521B has a second optical power—e.g. second curvature—arranged to form a second virtual image 550B of the second picture component at a second virtual image distance from the viewing plane 540. The first virtual image distance is greater than the second virtual image distance. The first optical power is less than the second optical power. The first far-field mirror 521A and first near-field mirror 521B may be freeform optical surfaces arranged to compensate for aberrations and the complex shape of the window of the vehicle.

The second mirror 422 of FIG. 4 is replaced by a second far-field mirror 522A and a second near-field mirror 522B. The second far-field mirror 522A is arranged to receive light of the first picture component from the picture generating unit 510 and direct that light onto the first far-field mirror 521A. The second near-field mirror 522B is arranged to receive light of the second picture component from the picture generating unit 510 and direct that light onto the first near-field mirror 521B.

In operation, light of the first picture component is directed onto the windscreen 430 by second far-field mirror 522A and then first far-field mirror 521A to form a first virtual image 550A of the first picture component in the windscreen 430 at a first virtual image distance from the viewing plane 540. Likewise, light of the second picture component is directed onto the windscreen 430 by second near-field mirror 522B and then first near-field mirror 521B to form a second virtual image 550B of the second picture component in the windscreen 430 at a second virtual image distance from the viewing plane 540, wherein the first virtual image distance is different to the second virtual image distance. The optical path corresponding to the second virtual image is substantially parallel to, but spatially-offset from, the optical path corresponding to the first virtual image. This is in order to keep the overall volume of the projection engine as small as possible. The first virtual image 550A and second virtual image 550B are spatially-separated—that is, offset in space—in order to provide a dual-plane display. The bundle of light rays forming the first virtual image 550A are generally parallel with the bundle of light rays forming the second virtual image 550B in the region from the picture generating unit 510 to the windscreen 430. More specifically, the volume of space formed by light rays of the first virtual image 550A is substantially parallel to volume of space formed by light rays of the second virtual image 550B in the region from the picture generating unit 510 to the windscreen 430. The volumes of space formed by the two sets of light rays intersect (i.e. cross) downstream the windscreen 430. Notably, whilst such a configuration has advantages in terms of compactness, it is not possible for the first virtual image and second virtual image to overlap whilst providing a flexible eyebox at the viewing plane which allows for normal head movement during operation. In short, the spatial separation of the two light channels required in this configuration results in a spatial separation of the virtual images 550A, 550B. The distance between the first virtual image 550A and second virtual image 550B is at least partially determined by the distance between the first near-field mirror 521B and the first far-field mirror 521A.

Figure 6:
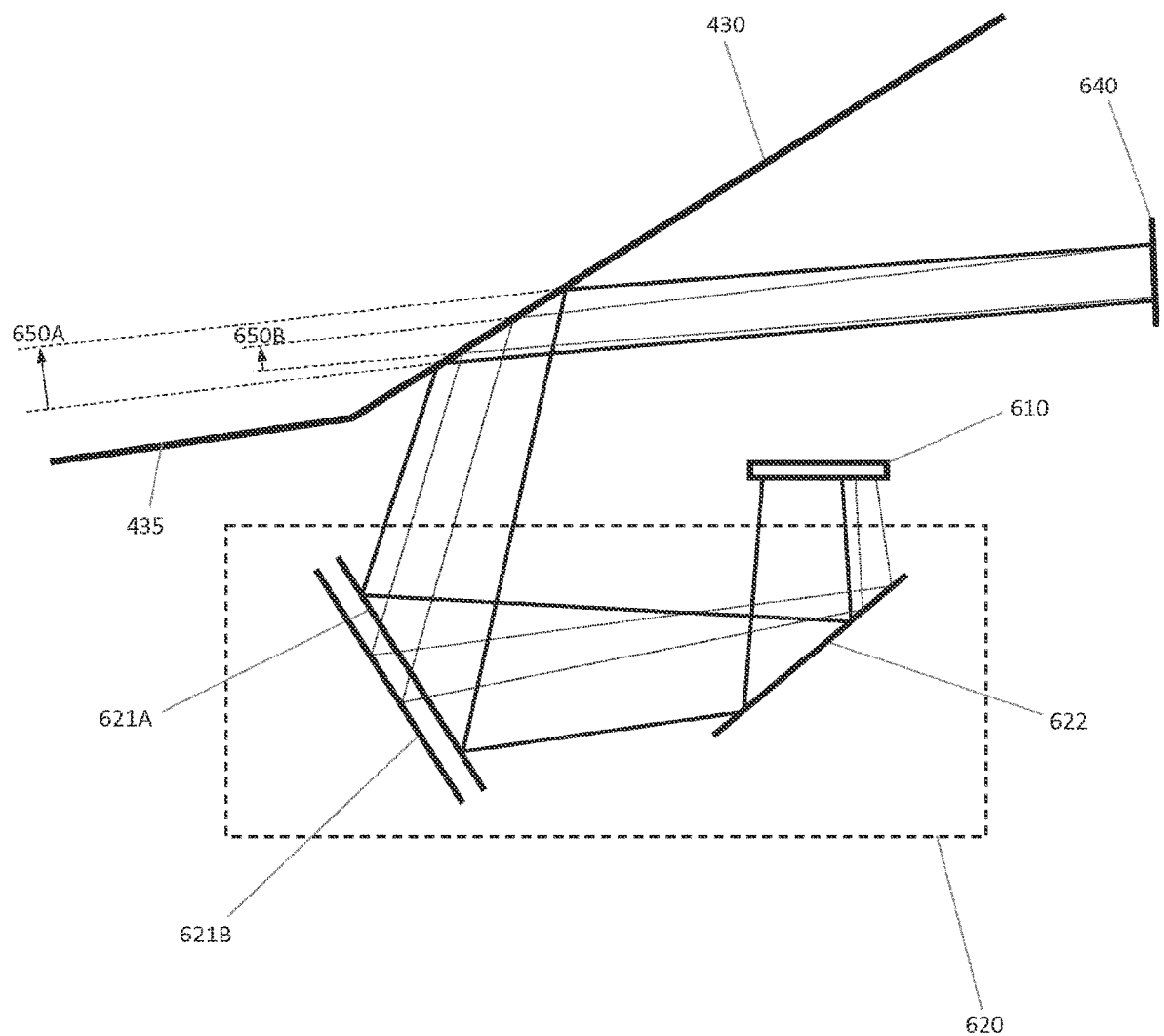
FIG. 6 shows an improved dual-plane head-up display.

FIG. 6 shows a second dual-plane HUD arranged to present information to the viewing plane 640 at a far-field plane and a near-field plane. In summary, the first picture component and second picture component are focused to different virtual image planes by using the two different surfaces of the first mirror and forming the first picture component and second picture component using oppositely (i.e. orthogonally) polarised light.

In more detail, light of the first picture component is polarised (i.e. linearly polarised) in a first polarisation direction and light of the second picture component is polarised in a second polarisation direction, wherein the first polarisation direction is perpendicular to the second polarisation direction. The first mirror is polarisation-selective. The first surface 621A of the first mirror is reflective to light polarised in the first polarisation direction and transmissive to light polarised in the second polarisation direction. The second surface 621B is reflective to light polarised in the second polarisation direction. Accordingly, the first surface 621A is arranged (e.g. shaped) to provide the necessary first optical power to form the first virtual image 650A of the first picture component at the first virtual image distance and the second surface 621B is arranged (e.g. shaped) to provide the necessary second optical power to form the second virtual image 650B of the second picture component at the second virtual image distance. In other words, the first surface 621A has first optical power for light having a first polarisation direction and the second surface 621B has second optical power for light having a second polarisation direction, wherein the first optical power is not equal to the second optical power. As per the other examples, the first surface and second surface may be different freeform optical surfaces. The functionality of the first and second surfaces may, of course, be reversed.

The embodiment of FIG. 6 is advantageous because the second virtual image 650B overlaps the first virtual image 650A (in space) when viewed from the viewing plane. The light of the first picture component forms a first light footprint on the first mirror and light of the second picture component forms a second light footprint on the first mirror. The first light footprint and second light footprint at least partially overlap. The footprint of the light of the second picture component on the first mirror is contained within the footprint of the light of the first picture component on the first mirror. In other words, the light of the second picture component illuminates an area of the first mirror which is also illuminated by light of the first picture component. More specifically, the light of the second picture component illuminates an area of the first surface 621A of the first mirror which is also illuminated by light of the first picture component. The volume of space formed by the bundle of light rays of the second virtual image 650B is generally contained within, or at least partially contained within, the volume of space formed by the bundle of light rays of the first virtual image 650A. Further advantageously, the volume of the projection engine 620 and the component count are reduced.

Figure 7:
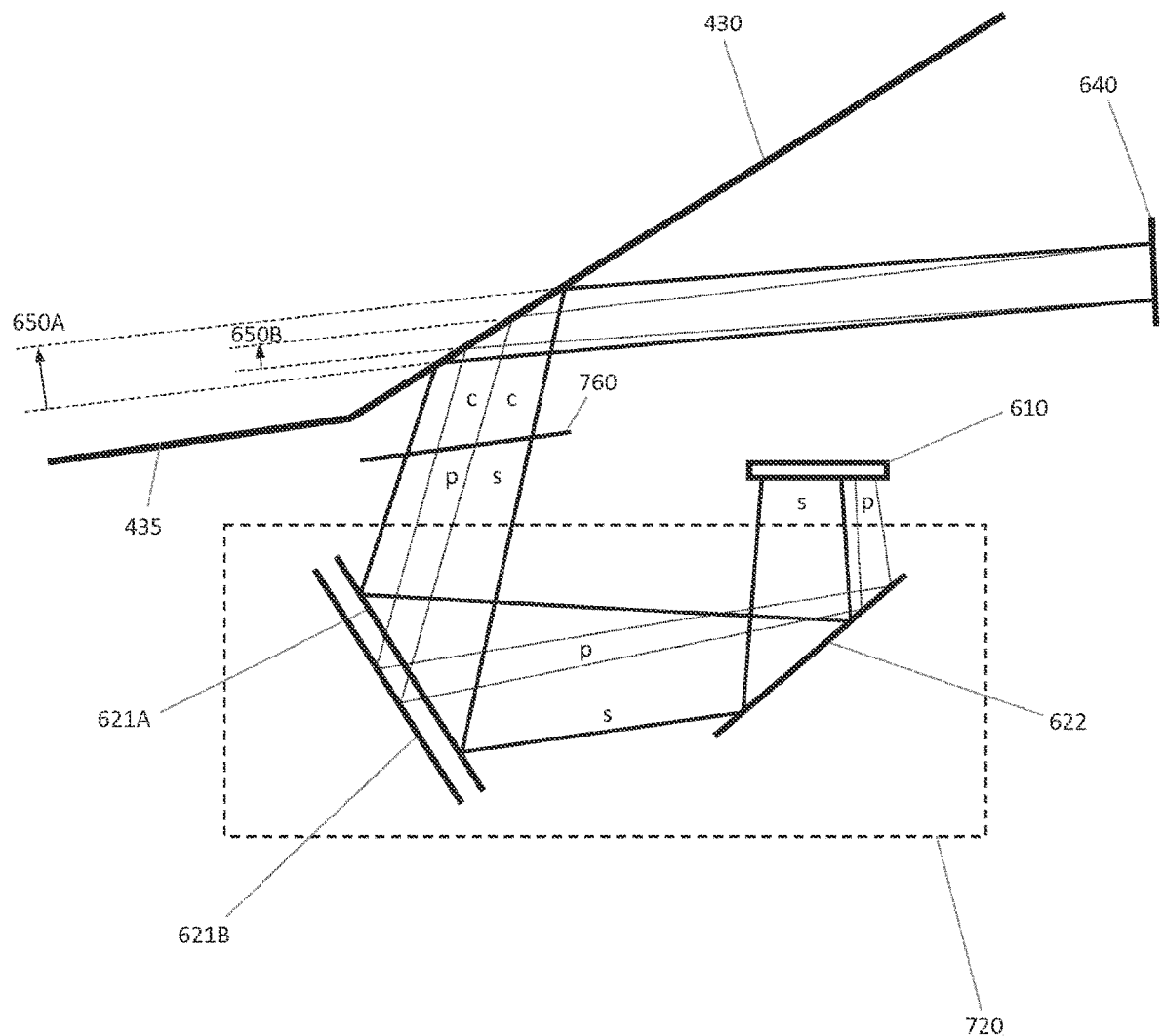
FIG. 7 shows an alternative dual-plane head-up display.

In the third dual-plane HUD shown in FIG. 7, the first polarisation direction is the s-polarisation direction of the window and the second polarisation direction is the p-polarisation direction of the window. In this embodiment, a quarter-wave plate 760 is used to convert both the s-polarised light (denoted by the letter "s") and the p-polarised light (denoted by the letter "p") into circularly polarised light (denoted by the letter "c"). This is advantageous because light of the two light channels will be equally reflected by the windscreen 430. In other words, the windscreen 430 is equally reflective to the received light of the first picture component and the received light of the second picture component. In embodiments, the quarter-wave plate 760 is an optical coating on a glare trap of the head-up display.

Figure 8:
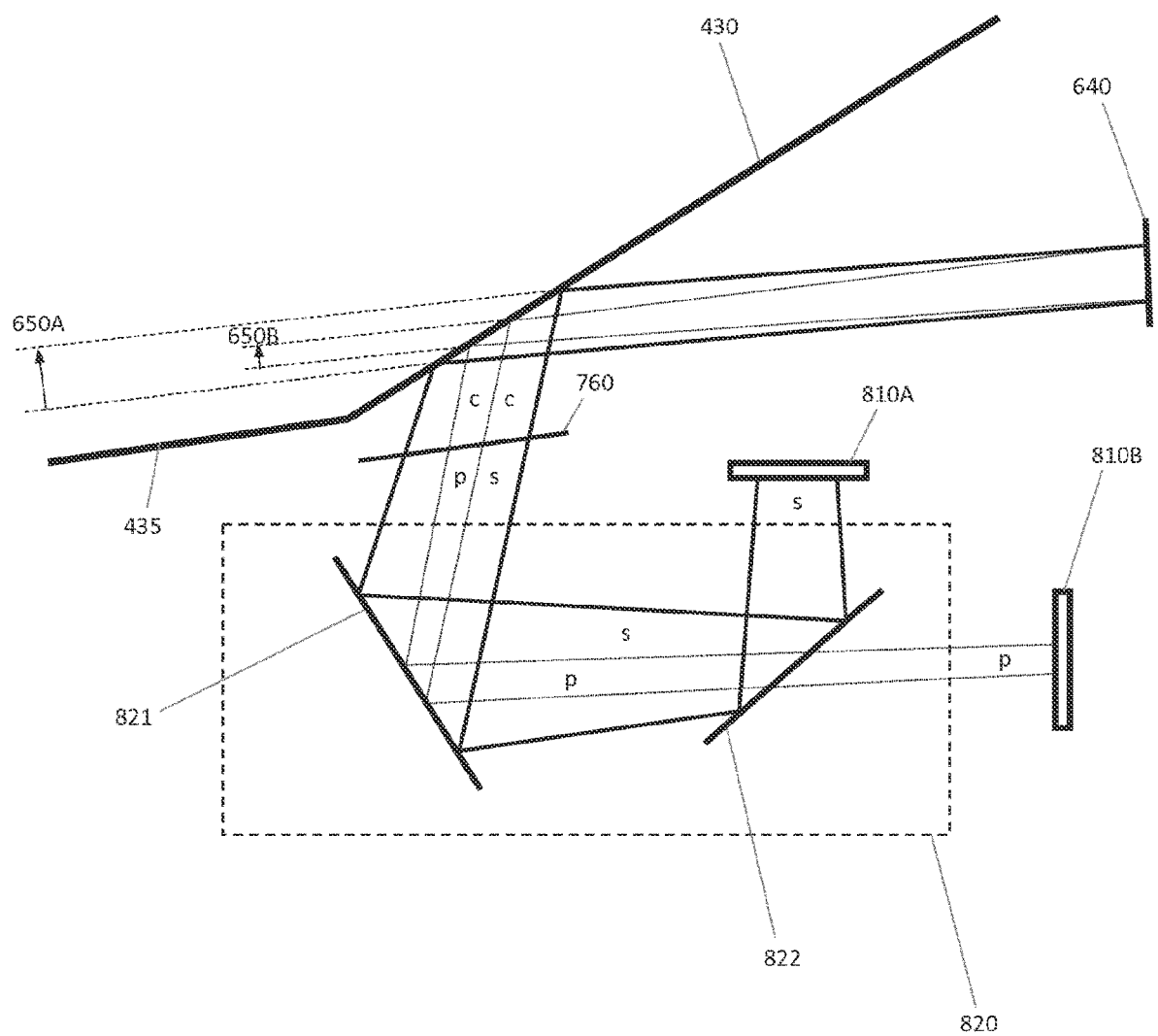
FIG. 8 shows a yet further dual-plane head-up display.

FIG. 8 shows a fourth dual-plane HUD in the which the first picture component is formed on a first surface 810A and the second picture component is formed on a second surface 810B. The second surface 810B is orthogonal to the first surface 810A and the second mirror 822 is transmissive to p-polarised light and reflective to s-polarised light. The first surface 810A and second surface 810B may be parts of different picture generating units or may be different image surfaces (e.g. different light-receiving surfaces such as diffuse surfaces) of a common picture generating unit. The first surface 810A is a first optical distance from the second mirror 822 and the second surface 810B is a second optical distance from the second mirror 822. In some embodiments, the first optical distance is not equal to the second optical distance.

In some embodiments, the light of the first picture component has a first wavelength (e.g. red) and the light of the second picture component has a second wavelength (e.g. green). The light of the first picture component and light of the second picture component have the same or different polarisation. The at least one optical element is a mirror, such as a dichroic mirror, having a first (e.g. front) surface transparent to the second wavelength and a second (e.g. back) surface. The first surface has first optical power at the first wavelength and the second surface has a second optical power at the second wavelength such that the first virtual image and second virtual image are formed at different distances from the viewing plane. A dual-plane HUD is therefore provided in which the first virtual image is e.g. red and the second virtual image is e.g. green. The first virtual image and second virtual image may at least partially overlap.

Figure 9:
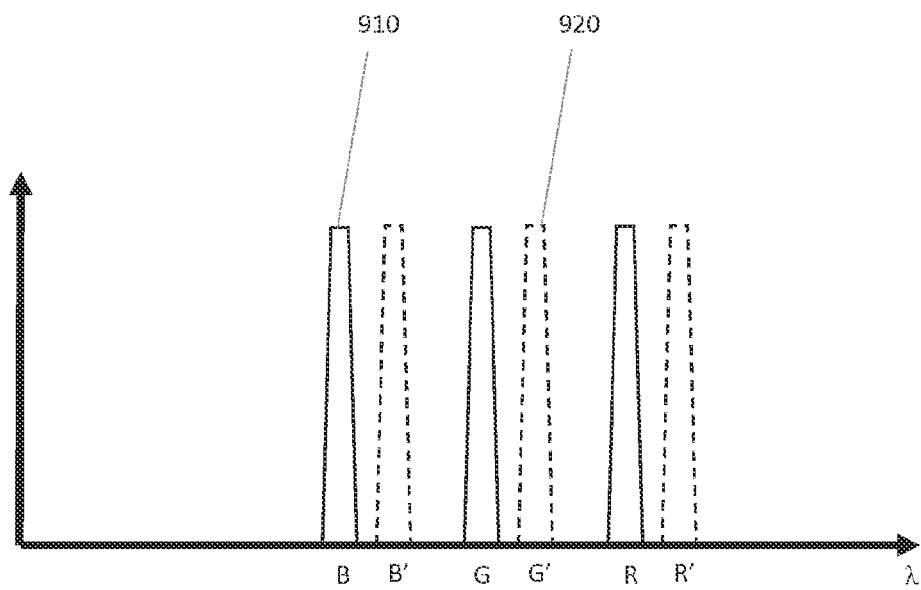
FIG. 9 shows an example of a first plurality of wavelengths and a second plurality of wavelengths which are substantially non-overlapping.

In some embodiments, the light of the first picture component comprises a first plurality of wavelengths—for example, the first plurality of wavelengths 910 represented by the solid line in FIG. 9. The light of the second picture component comprises a second plurality of wavelengths—for example, the second plurality of wavelengths 920 represented by the dashed line in FIG. 9. Each plurality of wavelengths may be used to form a white or pseudo-white picture component. For example, the first picture component may comprise red (R), green (G) and blue (B) components such as wavelengths of 640, 510 and 440 nm, and the second picture component may comprise red (R'), green (G') and blue (B') components such as wavelengths 660, 530 and 460 nm. The front surface of the at least one optical element may be coated such that the R, G and B wavelengths are reflected by the first surface having first optical power and the R', G' and B' wavelengths are transmitted to the second surface having second optical power.

In summary, in some embodiments, the first surface 810A alternatively or additionally comprises a first wavelength-selective coating corresponding to light of the first picture component and the second surface 810B alternatively or additionally comprises a second wavelength-selective coating corresponding to light of the second picture component. In some embodiments, the light of the first picture component has a first spectral distribution and light of the second picture component has a second spectral distribution.

It will be understood from FIGS. 6 to 8 that the projection engine comprises at least one polarisation-selective optical component arranged such that the first virtual image distance is different to the second virtual image distance. However, in other embodiments, the at least one optical element is additionally or alternatively wavelength-selective. It may therefore be said that the light of the first picture component and the light of the second picture component have a property state (i.e. light property state) which may be different. In embodiments described, the light property state is polarisation (e.g. angle of linear polarisation) and/or wavelength (e.g. colour or colours) but the present disclosure is equally applicable to any property state wherein the optical element is arranged to provide different optical power to different property states such that the first virtual image distance is different to the second virtual image distance and the first virtual image and second virtual image may overlap.

In any of the described embodiments, the light forming the picture may be incident upon the window at Brewster's angle (also known as the polarising angle) or within 15 degrees of Brewster's angle such as within 10, 5 or 2 degrees of Brewster's angle.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode. In some embodiments, the light receiving surface is a diffuser surface or screen such as a diffuser. The holographic projection system of the present disclosure may also be used to provide an improved head-mounted display, "HMD". In some embodiments, there is provided a vehicle comprising the HUD and a holographic projection system installed in a vehicle to provide a HUD. The vehicle may be an automotive vehicle such as a car, truck, van, lorry, motorcycle, train, airplane, boat, or ship.

The quality of the holographic reconstruction may be affect by the so-called zero order problem which is a consequence of the diffractive nature of using a pixelated spatial light modulator. Such zero-order light can be regarded as "noise" and includes for example specularly reflected light, and other unwanted light from the SLM.

In the example of Fourier holography, this "noise" is focused at the focal point of the Fourier lens leading to a bright spot at the centre of the holographic reconstruction. The zero order light may be simply blocked out however this would mean replacing the bright spot with a dark spot. Some embodiments include an angularly selective filter to remove only the collimated rays of the zero order. Embodiments also include the method of managing the zero-order described in European patent 2,030,072, which is hereby incorporated in its entirety by reference.

In some embodiments, the size (number of pixels in each direction) of the hologram is equal to the size of the spatial light modulator so that the hologram fills the spatial light modulator. That is, the hologram uses all the pixels of the spatial light modulator. In other embodiments, the size of the hologram is less than the size of the spatial light modulator. In some of these other embodiments, part of the hologram (that is, a continuous subset of the pixels of the hologram) is repeated in the unused pixels. This technique may be referred to as "tiling" wherein the surface area of the spatial light modulator is divided up into a number of "tiles", each of which represents at least a subset of the hologram. Each tile is therefore of a smaller size than the spatial light modulator. In some embodiments, the technique of "tiling" is implemented in the picture generating unit to increase image quality. Specifically, some embodiments implement the technique of tiling to minimise the size of the image pixels whilst maximising the amount of signal content going into the holographic reconstruction.

In some embodiments, the holographic pattern written to the spatial light modulator comprises at least one whole tile (that is, the complete hologram) and at least one fraction of a tile (that is, a continuous subset of pixels of the hologram).

The holographic reconstruction is created within the zeroth diffraction order of the overall window defined by the spatial light modulator. It is preferred that the first and subsequent diffraction orders are displaced far enough so as not to overlap with the image and so that they may be blocked using a spatial filter.

In embodiments, the holographic reconstruction is colour. In examples disclosed herein, three different colour light sources and three corresponding SLMs are used to provide a composite colour picture. These examples may be referred to as spatially-separated colour, "SSC". In a variation encompassed by the present disclosure, the different holograms for each colour are displayed on different area of the same SLM and then combining to form the composite colour image. However, the skilled person will understand that at least some of the devices and methods of the present disclosure are equally applicable to other methods of providing composite colour holographic images.

One of these methods is known as Frame Sequential Colour, "FSC". In an example FSC system, three lasers are used (red, green and blue) and each laser is fired in succession at a single SLM to produce each frame of the video. The colours are cycled (red, green, blue, red, green, blue, etc.) at a fast-enough rate such that a human viewer sees a polychromatic image from a combination of the images formed by three lasers. Each hologram is therefore colour specific. For example, in a video at 25 frames per second, the first frame would be produced by firing the red laser for $1/75$th of a second, then the green laser would be fired for $1/75$th of a second, and finally the blue laser would be fired for $1/75$th of a second. The next frame is then produced, starting with the red laser, and so on.

An advantage of FSC method is that the whole SLM is used for each colour. This means that the quality of the three colour images produced will not be compromised because all pixels of the SLM are used for each of the colour images. However, a disadvantage of the FSC method is that the overall image produced will not be as bright as a corresponding image produced by the SSC method by a factor of about 3, because each laser is only used for a third of the time. This drawback could potentially be addressed by overdriving the lasers, or by using more powerful lasers, but this would require more power to be used, would involve higher costs and would make the system less compact.

An advantage of the SSC method is that the image is brighter due to all three lasers being fired at the same time. However, if due to space limitations it is required to use only one SLM, the surface area of the SLM can be divided into three parts, acting in effect as three separate SLMs. The drawback of this is that the quality of each single-colour image is decreased, due to the decrease of SLM surface area available for each monochromatic image. The quality of the polychromatic image is therefore decreased accordingly. The decrease of SLM surface area available means that fewer pixels on the SLM can be used, thus reducing the quality of the image. The quality of the image is reduced because its resolution is reduced. Embodiments utilise the improved SSC technique disclosed in British patent 2,496, 108 which is hereby incorporated in its entirety by reference.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

Some embodiments describe 2D holographic reconstructions by way of example only. In other embodiments, the holographic reconstruction is a 3D holographic reconstruction. That is, in some embodiments, each computer-generated hologram forms a 3D holographic reconstruction.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g. a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A head-up display for a vehicle having a window, the head-up display comprising:
   a picture generating unit arranged to output pictures, wherein each picture comprises a first picture component and a second picture component;
   a projection engine arranged to receive the pictures output by the picture generating unit and project the pictures onto the window of the vehicle in order to form a first virtual image of the first picture component at a first virtual image distance from a viewing plane and a second virtual image of the second picture component at a second virtual image distance from the viewing plane, wherein the first virtual image distance is substantially different from the second virtual image distance, and wherein light of the first picture component is polarised in a first polarisation direction and light of the second picture component is polarised in a second polarisation direction perpendicular to the first polarisation direction,
   wherein the projection engine comprises
      a first polarisation-selective reflective surface arranged to receive light of the first picture component and light of the second picture component and to reflect the light of the first picture component a first optical power and to transmit the light of the second picture component; and
      a second reflective surface arranged to receive light of the second picture component transmitted by the first polarization-selective mirror and to reflect the light of the second picture component transmitted by the first polarization-selective mirror with a second optical power,
      the first optical power being substantially different than the second optical power.

2. A head-up display as claimed in claim 1 wherein the projection engine is arranged such that the light ray bundle received by the first polarisation-selective reflective surface forming the second virtual image is at least partially contained within the light ray bundle received by the first polarisation-selective reflective surface and forming the first virtual image.

3. A head-up display as claimed in claim 1 wherein the first picture component and second picture component are coplanar at the picture generating unit.

4. A head-up display as claimed in claim 1 wherein the first reflective surface is a first freeform reflective optical surface and the second surface is a second freeform reflective optical surface having a different surface profile to the first freeform optical surface.

5. A head-up display as claimed in claim 1 wherein the first reflective surface is reflective to at least one wavelength of the light of the first picture component and transmissive to other wavelength/s, and the second reflective surface is reflective to at least one wavelength of the light of the second picture component.

6. A head-up display as claimed in claim 1 wherein the first picture component is a far-field image and the second picture component is a near-field image, and wherein the first virtual image distance is greater than the second virtual image distance.

7. A head-up display as claimed in claim 1 wherein the first polarisation direction is at an angle of $\pi/4$ to the s-polarisation direction of the window.

8. A head-up display as claimed in claim 1 wherein the first polarisation direction is the s-polarisation direction of the window and the second polarisation direction is the p-polarisation direction of the window, and the projection engine further comprises a quarter-wave plate arranged to receive the light of the first picture component and the light of the second polarisation component such that light of the pictures projected onto the window of the vehicle is circularly polarised.

9. A head-up display as claimed in claim 8 wherein the head-up display comprises a glare trap window and the quarter-wave plate is a coating on the glare trap window.

10. A head-up display as claimed in claim 8 wherein the quarter-wave plate is a coating on the window.

11. A head-up display as claimed in claim 1 wherein the picture generating unit comprises:
    a light source arranged to emit light; and
    a spatial light modulator arranged to receive the light from the light source and spatially-modulated the light in accordance with computer-generated holograms displayed on the spatial light modulator to form a holographic reconstruction corresponding to each picture.

12. A head-up display as claimed in claim 11 wherein the picture generating unit further comprises a light-receiving surface arranged to receive the spatially-modulated light such that each picture is formed thereon.

13. A head-up display as claimed in claim 1 wherein the window is a windscreen.

14. A head-up display as claimed in claim 1 wherein one of the first and second polarisation directions is the s-polarisation direction of the window and the other of the first and second polarisation directions is the p-polarisation direction of the window, and the projection engine further comprises a quarter-wave plate arranged to receive the light of the first picture component and the light of the second polarisation component such that light of the pictures projected onto the window of the vehicle is circularly polarised.

15. A head-up display as claimed in claim 1, wherein the projection engine comprises a polarisation-selective optical element that includes the first reflective surface and the second reflective surface.

16. A head-up display as claimed in claim 1, arranged such that one of the first and second picture components is displayed in the near-field with respect to the viewing plane, and the other of the first and second picture components is displayed in the far-field with respect to the viewing plane.

17. A method of providing a head-up display for a vehicle having a window, the method comprising:
    providing a plurality of pictures, each picture comprising a first picture component and a second picture component;
    projecting the pictures onto the window of the vehicle in order to form a first virtual image of the first picture component at a first virtual image distance from a viewing plane and a second virtual image of the second picture component at a second virtual image distance from the viewing plane, wherein the first virtual image distance is substantially different from the second virtual image distance, and wherein light of the first picture component is polarised in a first polarisation direction and light of the second picture component is polarised in a second polarisation direction perpendicular to the first polarisation direction,
    wherein the projection comprises
        receiving light of the first picture component and light of the second picture component at a first polarisation-selective reflective surface having a first optical power;
        reflecting light of the first picture component from the first polarisation-selective reflective surface and transmitting light of the second picture component through the first polarisation-selective reflective surface;
        receiving from the first polarization-selective reflective surface light of the second picture component at a second reflective surface having a second optical power,
the first optical power being different than the second optical power.

18. A head-up display for a vehicle having a window, the head-up display comprising:
    a first picture-generating surface arranged to output a first picture component and a second picture-generating surface arranged to output a second picture component;
    a projection engine arranged to receive the picture components output by the picture generating surfaces and project the pictures components onto the window of the vehicle in order to form a first virtual image of the first picture component at a first virtual image distance from a viewing plane and a second virtual image of the second picture component at a second virtual image distance from the viewing plane, wherein the first virtual image distance is substantially different from the second virtual image distance, and wherein light of the first picture component is polarised in a first polarisation direction and light of the second picture component is polarised in a second polarisation direction perpendicular to the first polarisation direction,
    wherein the projection engine comprises
        a first polarisation-selective reflective surface arranged to receive and reflect light of the first picture component and to receive and transmit light of the second picture component and to reflect the light of the first picture component a first optical power and to transmit the light of the second picture component; and
        a second reflective surface arranged to receive and reflect light of the first picture component reflected by the first polarisation-selective reflective surface, and to receive and reflect light of the second picture component transmitted by the first polarisation-selective surface,
    wherein the first picture-generating surface is a first optical distance from the second reflective surface and the second picture-generating surface is a second optical distance from the second reflective surface, the second optical distance being substantially different from the first optical distance.

* * * * *